United States Patent [19]

Ishizaki et al.

[11] Patent Number: 5,144,620
[45] Date of Patent: Sep. 1, 1992

[54] CROSS-CONNECTION NETWORK USING TIME SWITCH

[75] Inventors: Yasutoshi Ishizaki; Rikio Maruta; Yoshinori Rokugo; Hisashi Sakaguchi; Kuniyasu Hayashi, all of Tokyo, Japan

[73] Assignee: NEC Corporation, Tokyo, Japan

[21] Appl. No.: 478,879

[22] Filed: Feb. 8, 1990

Related U.S. Application Data

[62] Division of Ser. No. 99,963, Sep. 23, 1987, Pat. No. 4,935,921.

[30] Foreign Application Priority Data

Sep. 30, 1986 [JP] Japan .............................. 61-233634
May 20, 1987 [JP] Japan .............................. 62-121070
Jun. 26, 1987 [JP] Japan .............................. 62-157945
Aug. 18, 1987 [JP] Japan .............................. 62-203457

[51] Int. Cl.$^5$ .............................................. H04J 3/06
[52] U.S. Cl. ..................................... 370/84; 370/102; 370/105.1; 370/112; 375/112
[58] Field of Search ................. 370/84, 102, 67, 66, 370/58.1, 58.2, 58.3, 100.1, 105.1, 112; 375/112, 111

[56] References Cited

U.S. PATENT DOCUMENTS

| | | | |
|---|---|---|---|
| 4,224,473 | 9/1980 | Kaul et al. | 370/84 |
| 4,649,536 | 3/1987 | Krinock | 370/102 |
| 4,667,324 | 5/1987 | Graves | 370/102 |
| 4,698,801 | 10/1987 | Hatano et al. | 370/84 |
| 4,805,165 | 2/1989 | Kawamura et al. | 370/84 |
| 4,807,221 | 2/1989 | Stummer | 370/102 |
| 4,829,518 | 5/1989 | Iquchi et al. | 370/102 |
| 4,899,339 | 2/1990 | Shibagaki et al. | 370/102 |

Primary Examiner—Douglas W. Olms
Assistant Examiner—Alpus H. Hsu
Attorney, Agent, or Firm—Sughrue, Mion, Zinn Macpeak & Seas

[57] ABSTRACT

An internal frame signal producing circuit for use in a cross connection system which cross connects first bit rate signals, each produced by multiplexing m second bit rate signals at first or the second bit rate signal levels, the first bit rate being higher than the second bit rate, an internal frame frequency is predetermined to be equal to a frequency $f_h'$ higher than a first nominal frequency $f_h$ of the first bit rate digital signals by a predetermined value, the frequency $f_h'$ being synchronized with a second nominal frequency fl of the second bit rate digital signals. In order to obtain the internal frame signal, from m second bit rate signals, the m second bit rate signals are stuff-synchronized processed to produce m stuff-synchronized signals, each having a stuff bit, a variable bit, and vacant bit at suitable bit intervals in a frame of a frame length. The m stuffed-synchronized signals are serially arranged to make the internal frame signal. In order to compensate a frequency difference between $f_h'$ and fl, one frame consisting of all vacant bits is assigned at predetermined frame intervals.

2 Claims, 10 Drawing Sheets

CROSS-CONNECTION NETWORK USING TIME SWITCH

This is a divisional of application Ser. No. 07/099,963 filed Sep. 23, 1987 now U.S. Pat. No. 4,935,921.

BACKGROUND OF THE INVENTION

The present invention relates to a cross-connection network for use in digital transmission and in particular, to the cross-connection network for interchanging transmission paths of time division multiplexed signals to one another in a station.

The cross-connection network is for use in initial route setting of transmission paths and change of routes which are necessary on an increase of transmission paths, change of services, and occurrence of a fault.

With an extension of available field of digital communication, recent requirements are directed to a reduction of size in a device, a decrease of a space for laying cables, saving labor for cross connection, and a variation of switchable hieratchy levels, in such a cross-connection network.

A conventional cross-connection network of the type described uses a distribution frame comprising switch groups switching mutual connection or cross connection of a plurality of signal lines (for example, coaxial cables) from one to another. The switches are manually operated.

Such a digital signal transmitted on the transmission paths is classified into two types one of which is of a synchronous type and the other being of an asynchronous type. For the digital signal of the asynchronous type, a space division switch alone is used to carry out cross connection of the signal lines as the switch groups in the distribution frame because no consideration is made about application of a time division switch so as to interchange time slots from one to another.

Such use of a space division switch in the cross-connection network results in difficulties of a reduction of devices in size, saying the space for laying the transmission cables, and a change of switching units. Therefore, it is impossible to completely respond to the above-mentioned recent requirements.

More specifically, a restriction is imposed on reducing the space division switch in size, although the time division switch can readily be small sized by integrating circuits.

In addition, it is necessary to switch connections from one to another at every unit formed by a lower order group by demultiplexing a higher order group into a plurality of the lower order groups in order to cope with a wide variety of switching units. For this purpose, the conventional network comprising the space division switch should comprise a demultiplexer for demultiplexing the digital signals of the higher order group into lower order groups which are sent to the distribution frame. The network further comprises a multiplexer for multiplexing the lower order groups into a higher order group which is sent out from the network. Thus, the cross-connection network inevitably includes the multiplexer and the demultiplexer in addition to the distribution frame. In order to transmit the demultiplexed digital signals of the lower order group, signal lines are inevitably increased in number. This makes a reduction of the device and the collecting space impossible.

SUMMARY OF THE INVENTION

It is an object of the present invention to provide an internal frame signal producing circuit for use in a cross-connection network which can cross connect between input and output lines by the use of a time division switch in relation to asynchronous digital signals.

It is another object of the present invention to provide an internal frame signal producing circuit for use in a cross-connection network of the type described, which can reduce a device in size and a line laying space.

A cross-connection network has a plurality of input lines and a plurality of output lines and is operable in response to a plurality of input digital signals incoming through the input lines, the input digital signals having a first nominal bit rate in common, so as to deliver the plurality of the input signals to the output lines as a plurality of output digital signals.

According to the present invention, the internal frame signal circuit for use in a cross-connection network comprises synchronizing means responsive to the input digital signals for carrying out pulse stuffing on the plurality of the input digital signals at a second bit rate higher than the first bit rate to produce a plurality of synchronized signals synchronized with one another, each of which includes signal bits for each of the input digital signals and extra bits different from the signal bits, the signal and the extra bits being arranged in time slots. Multiplexing means is coupled to the synchronizing means for multiplexing the plurality of synchronized signals into at least one multiplexed signal, each of the at least one multiplexed signal having a plurality of frames assigned to the plurality of synchronized signals, each of the plurality of frames having bit signals in each one of the plurality of synchronized signals assigned thereto, each of the plurality of frames being also assigned to the plurality of output lines. Means for assigning vacant slots to all bits in one frame at predetermined frame intervals to compensate for the difference between the higher internal frame frequency and the nominal frequency of a second bit rate digital signal. Exchanging means is operable in a time division fashion for exchanging the frames to one another in the at least one multiplexed signal to produce at least one exchanged multiplexed signals after exchanging the frames. Demultiplexing means is coupled to the exchanging means for demultiplexing the at least one exchanged multiplexed signal into a plurality of demultiplexed signals having the bit signals in the frames, respectively. Destuff means is coupled to the demultiplexing means for producing the plurality of output digital signals by removing the extra bits from said a plurality of demultiplexed signals, each one of the plurality of output digital signals being delivered to each one of said plurality of output lines assigned with one of the frames corresponding to the each one output signal.

3

DESCRIPTION OF THE PREFERRED EMBODIMENTS

Figure 1:
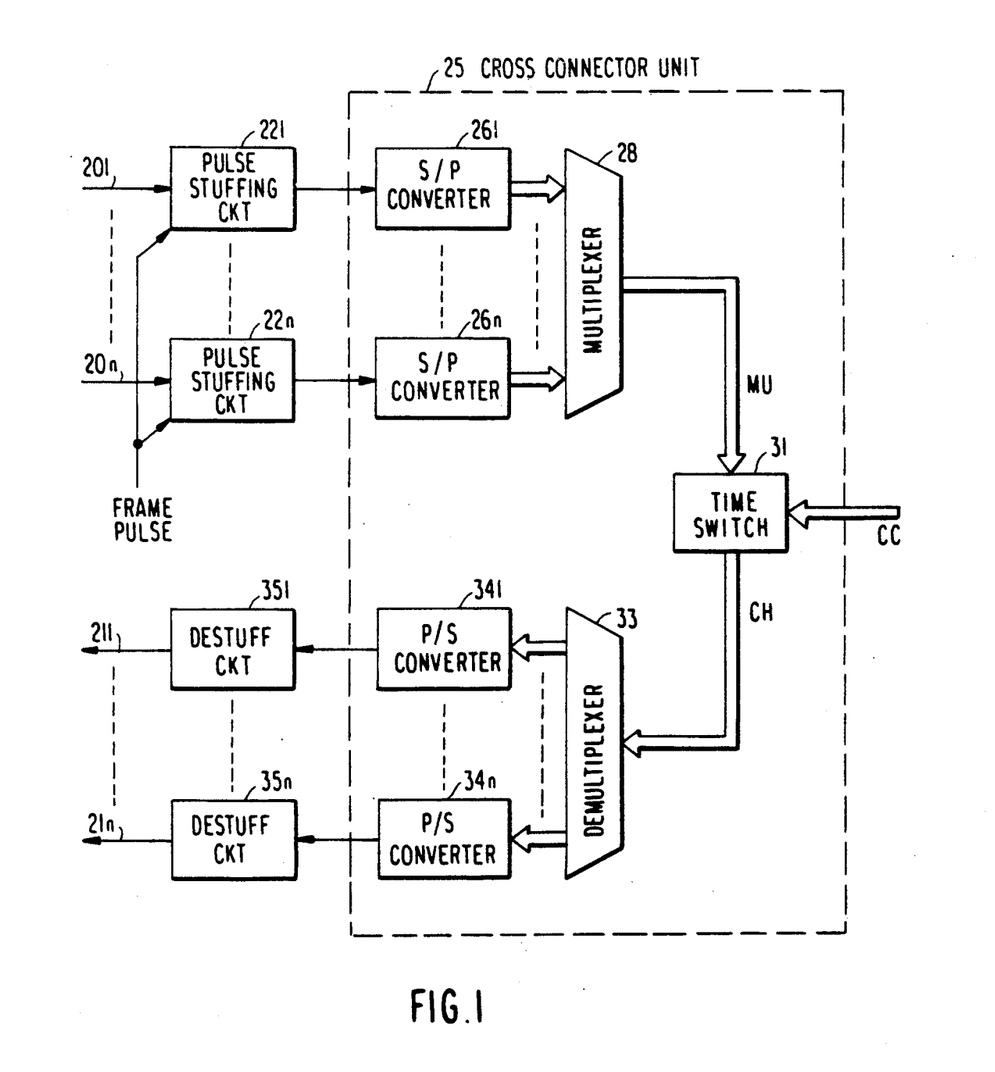
FIG. 1 is a block circuit view of a cross-connection network according to a first embodiment of the present invention.

Referring to FIG. 1, a cross-connection network according to a first embodiment of this invention is connected between first through n-th input lines 201 to 20n and first through n-th output lines 211 to 21n, where n is a natural number greater than unity. Supplied with first through n-th input digital signals through the first through n-th input lines 201 to 20n, the cross-connection network is operable to assign the first through n-th input digital signals to the first through n-th output lines 211 to 21n in response to a connection control signal CC. The first through n-th input digital signals have a common nominal bit rate fo and are delivered to assigned ones of the first through n-th output lines 211 to 21n. Such input digital signals may be a low order group of, for example, DS1 having the bit rate of 1.544 MHz (or 1.544 Mb/s). The first through n-th output lines 211 to 21n are given first through n-th output digital signals each of which has a bit rate fo equal to the nominal bit rate fo.

The first through n-th input digital signals are sent to first through n-th pulse stuffing circuits 221 to 22n each of which is similar in structure and operation to one another. Description will be therefore made about the first pulse stuffing circuit 221, alone.

In the first pulse stuffing circuit 221, pulse stuffing is carried out on the first input digital signal by the use of a sequence of internal clock pulses having an internal bit rate fs greater than the nominal bit rate fo. As a result, the first stuffing circuit 221 successively produces a first pulse stuffed signal which is subjected to the pulse stuffing and which has a predetermined format specified by a succession of frames. It is assumed that each of the frame is composed of m bits (m being integer).

The remaining pulse stuffing circuits 222 to 22n are operated in the above-mentioned manner and produce second through n-th pulse stuffed signals which are synchronized with the first local synchronized signal and which have the same bit fs rate as the latter. The first through n-th pulse stuffing circuits 221 to 22n may collectively be called a pulse stuffing unit while the first through n-th pulse stuffed signals may collectively be referred to as a pulse stuffed signal.

Figure 2:
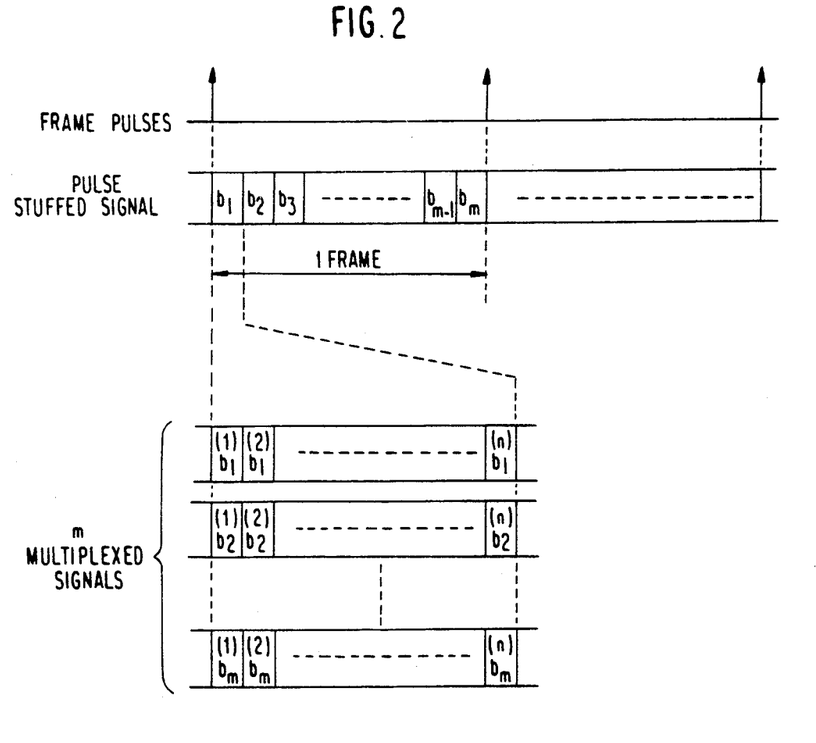
FIG. 2 is a view illustrating frame formats of a pulse-stuffed signal and m multiplexed signals in the network of FIG. 1.

Temporarily referring to FIG. 2, each of the first through n-th pulse stuffed signals is led by frame pulses as shown along a first line of FIG. 2, and has each of the frames that is composed of first through m-th bits b1 to bm, as illustrated along a second line of FIG. 2. The first through m-th bits b1 to bm of the frame are composed of a plurality of extra bits, such as a frame bit, at least one stuff bit, and a stuff control bit, in addition to one of the first through n-th input digital signals.

In FIG. 1, a cross-connector unit 25 comprises first through n-th serial-to-parallel (S/P) converters 261 to 26n supplied with the first through n-th pulse stuffed signals, respectively. The first through n-th pulse stuffed signals are subjected to S/P conversion by the first through n-th S/P converters 261 to 26n and converted into first through n-th parallel signals each of which is composed of m bits. Thus, the S/P conversion is carried out at every frame of m bits. The first through n-th parallel signals are sent to a multiplexing circuit 28 at every frame.

The multiplexing circuit 28 multiplexes the first through n-th parallel signals into m parallel multiplexed signals MU as shown in FIG. 2. More specifically, the first bits of the first through n-th pulse stuffed signals are depicted at $b1^{(1)}, b1^{(2)}, \ldots b1^{(n)}$ and are successively arranged in a time division fashion as shown along the third line of FIG. 2. Such a time divisional arrangement of $b1^{(1)}, b1^{(2)}, \ldots b1^{(n)}$ may be called a first group. Likewise, the second bits $b2^{(1)}, b2^{(2)}, \ldots b2^{(n)}$ are arranged in the time division fashion synchronized with first bits $b1^{(1)}, b1^{(2)}, \ldots b1^{(n)}$, as shown along the fourth line of FIG. 2, and will be referred to as a second group. While, the m-th bits $bm^{(1)}, bm^{(2)}, \ldots bm^{(n)}$ are arranged in the above-mentioned manner to form an m-th group. Thus, m parallel multiplexed signals are produced to have the first to m-th groups, respectively.

From this fact, it is readily understood that the multiplexing circuit 28 multiplexes first through m-th bits of the first through n-th parallel signals at every bit, respectively. This means that first through m-th bits in i-th one of the first through n-th S/P converters 261 to 26n simultaneously produce in first through m-th parallel multiplexed signal, respectively, and j-th bit in the first through m-th bits in the i-th one can be depicted at $bj^{(i)}$, where j is a natural number between 1 and m, both inclusive.

The multiplexed signals MU are sent to a time switch 31 and are switched under control by the connection control signal CC which is given from a common controller in the known manner. The connection control signal is indicative of interchange of the bits or time slots arranged in each of the m parallel multiplexed signals MU. As a result, the connection control signal CC indicates the interchange of first through n-th ones of the time slots in each of first through m-th groups. Therefore, the time switch 31 interchanges the first through n-th time slots in the first through m-th groups and produces first through m-th interchanged parallel signals CH. Each of the first through m-th parallel signals CH is composed of first through n-th bits as a result of multiplex in the multiplexer 28 but time slots are interchanged according to the connection control signal CC. The first through n-th bits of each of first through m-th interchanged signals CH are demultiplexed by the demultiplexer 33 and distributed to first through n-th P/S converters 341 to 34n, respectively. Thus, first through n-th P/S converters 341 to 34n receive first through n-th m-bit parallel signals, respectively, and supply first through n-th destuff circuits 351 to 35n with first through n-th serial signals each of which composed of m bits.

Each destuff circuit 351 to 35n establishes frame synchronization and thereafter removes the extra bits to produce the first through n-th output signals which are reproduction of the first through n-th input digital signals appearing as a result of the interchange of the time slots. The first through n-th output signals are delivered to the first through n-th output lines 211 to 21n, respectively.

As mentioned above, the first through n-th input digital signals, even if they are asynchronous to one another, are subjected to pulse stuffing to form first through n-th pulse stuffed signals which are synchronized to one another. The pulse stuffed signals are multiplexed in a time divisional fashion. This enables interchange of the time slots by the time switch 31 and cross-connection or delivery of the first through n-th input signals to the n output lines 211 to 21n, respectively, as desired. Accordingly, it is possible to reduce a switch for cross connection in size and to save a cable laying space in comparison with the conventional network. In addition, it is possible to rapidly switch routes for cross-connection from one to another only by the use of the connection control signal CC.

In the illustrated example, the S/P converters 261 to 26n and the P/S converters 341 to 34n are included in the cross-connector unit 25 so as to adjust a bit rate (namely, fs×(n/m)) of the multiplexed signals MU to be equal to a switching rate of the time switch 31. However, such converters 261 to 26n and 341 to 34n may be removed from the cross-connector unit 25 when the time switch 31 is operable at a bit rate of (fs×n).

Figure 3:
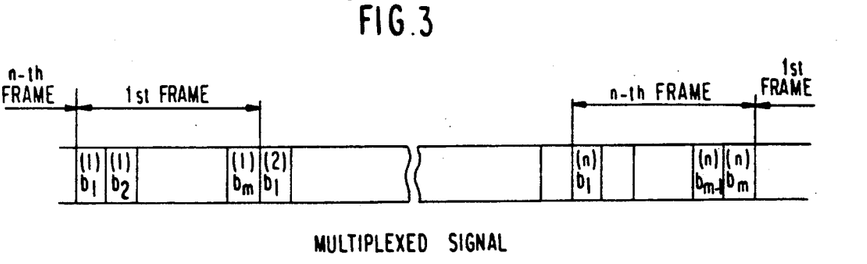
FIG. 3 is a view illustrating a frame format of a multiplexed signal in a modification of a the network of FIG. 1.

In no use of the S/P converters 261-26n and the P/S converters 341-34n, pulse-stuffed signals from pulse stuffing circuits 221-22n are multiplexed at the multiplexer 28 and are formed to a multiplexed signal comprising first through n-th frames serially arranged as shown in FIG. 3. The first through n-th frames are composed of frames in the pulse stuffed signals from the first through n-th pulse-stuffing circuits 221-22n, respectively.

The time switch 31 interchanges time slots to interchange a plurality of frames to one another by the connection control signal CC and produces an interchanged multiplexed signal wherein frames are interchanged to one another. The interchanged multiplexed signal is demultiplexed at the demultiplexer 33 and the resultant multiplexed signals are applied to destuff circuits 351-35n, respectively.

Now, description is made as to an example where n=28 and the input digital signals are DS1 signals (1.544 Mb/s).

The twenty-eight input DS1 signals are pulse stuffed at pulse stuffing circuits 221-22n and are multiplexed to a multiplexed signal having a frequency $f_h'$ of 45.808 MHz which will be called DS3' signal.

A pulse stuffing ratio $\rho$ is determined by the following equation (1):

$$\rho = \frac{L'(f_h - N f_o) - f_o(H' - NL')}{f_h'} \quad (1)$$

where L' is number of bits of one DS1 signal assigned to one frame (which is equal to m in FIGS. 2 and 3), H' being number of entire bits in a multiframe, fo being a frequency of a signal to be pulse stuffed (DS1=1.544 MHz), N being a multiplicity (=28).

Figure 4:
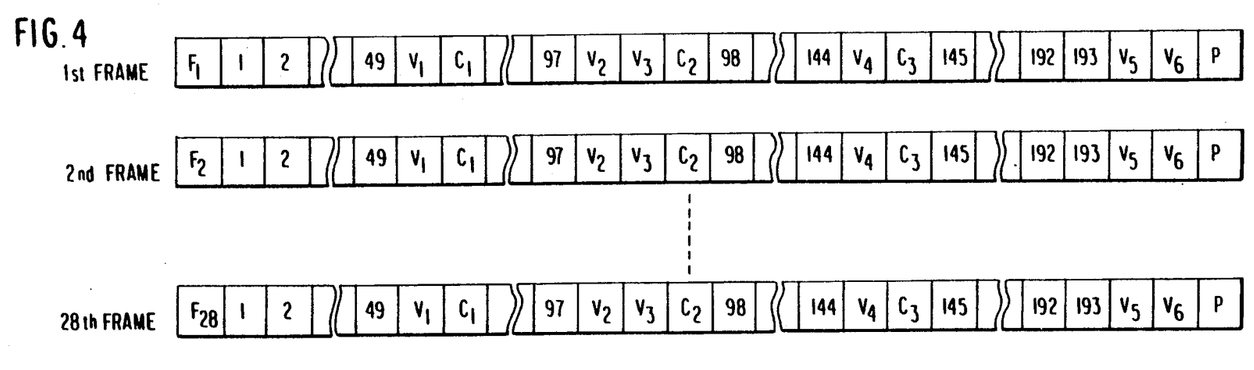
FIG. 4 is a view illustrating a multiframe format of a D53' signal which is formed by pulse stuffing and multiplexing 28 asynchronous DS1 signals.

When L'=204 and therefore H'=204×28=5712, the multiplexed signal DS3' has a format as depicted in FIG. 4.

Referring to FIG. 4, each frame comprises a first bit for a frame pulse F, data bits 1-193, vacant bits $V_1$-$V_6$, stuff control bits $C_1$-$C_3$, and a parity bit P. These first through 28th frames are arranged serially as shown in FIG. 3.

When twenty-eight input DS1 signals are synchronized with each other, a format of the multiplexed signal should be determined by the following equation (2) in addition to equation (1) because data bit arrangement of a digroup in each of input DS1 signals should be maintained as it is:

$$f_h' = \frac{f_o \times N \times (L' - \phi)}{D_1} \quad (2)$$

where $\phi$ is a variable of a frame length and a simple rational number and $D_1$ is a frame length of one digroup.

The digroup is a piece of data bits of 24 channels each of which is composed of eight data bits and one digroup comprises one-hundred and ninety-three (193) bits.

Figure 5:
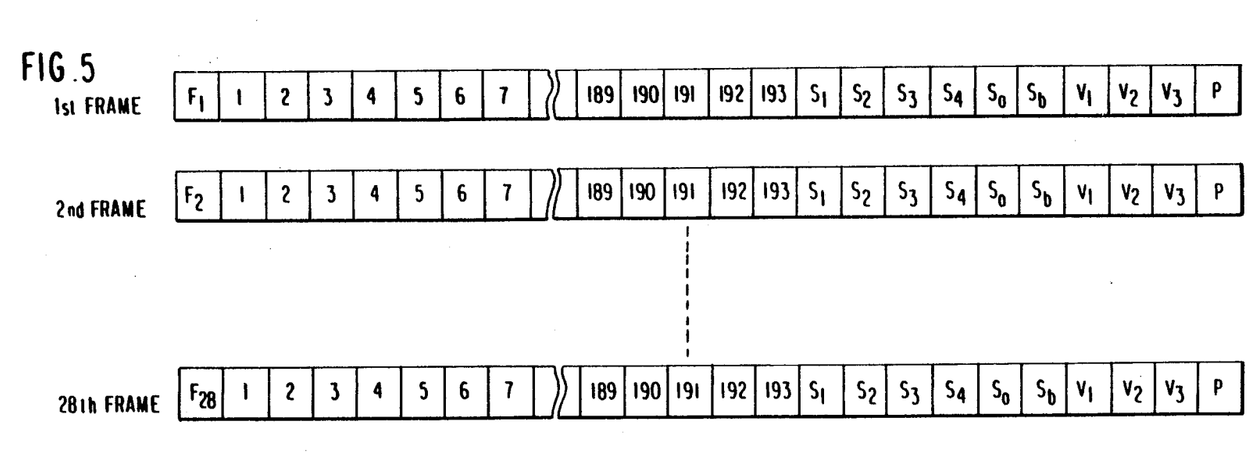
FIG. 5 is a view illustrating a multiframe format of another D53' signal which is formed by pulse stuffing and multiplexing 28 synchronous DS1 signals.

The format of the multiplexed signal is as shown in FIG. 5. Each of the first through 28-th frames comprises a first bit for a frame pulse F, and data bits 1-193. Digroups of the first through 28th DS1 signals are distributed in the first through 28th frames, respectively. After data bits, there are assigned signal bits $S_1$-$S_4$, $S_a$, and $S_b$ for future use, vacant bits $V_1$-$V_3$, and a parity bit P at the last bit.

In use of the format of FIG. 5, the input DS1 signals are completely synchronized with the multiplexed signal DS3' by providing a vacant frame comprising two-hundreds and four (204) vacant bits once per 5 four-hundreds and nine (409) frames.

Figure 6:
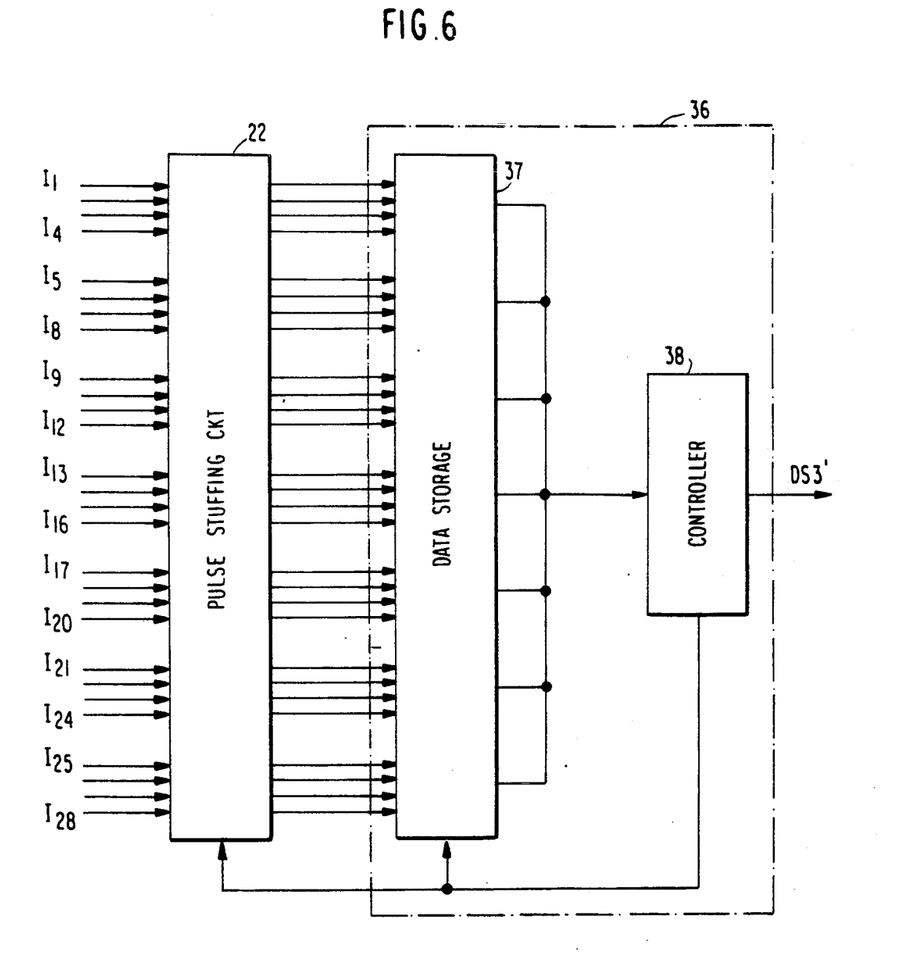
FIG. 6 is a block circuit view illustrating an interface according to another embodiment to produce DS3' signal from 28 DS1 signals.

When number of input lines are a multiple of twenty-eight (28) and when DS1 signals income through the input lines, the input DS1 signals can be classified into a plurality of sets each comprising twenty-eight DS1 signals, so that each set of twenty-eight input DS1 signals is processed to produce DS3' signal comprising the format as depicted in FIGS. 4 or 5 in dependence on whether or not twenty-eight input DS1 signals are synchronized with one another by use of an interface as shown in FIG. 6.

Referring to FIG. 6, the interface shown therein comprises a pulse stuffing circuit for pulse stuffing twenty-eight DS1 signals incoming through twenty-eight input lines I1-I28. The resultant twenty-eight pulse stuffed signals have respective frame formats shown in FIG. 4 or FIG. 5. The pulse stuffed signals are supplied to a multiplexer 36 which comprises a data storage 37 and a controller 38.

The pulse stuffed signals are temperarily stored in the data storage 37 and are read out from the data storage 37 by controller 38 in the order of the frame numbers 1-28. Accordingly, the frames 1-28 are serially arranged one after another to form a multiplexed signal which is sent out from the controller as the DS3′ signal. Then, resultant multiplexed signals comprising the format in FIG. 4 and/or FIG. 5 are further multiplexed and then applied to the time switch (31 in FIG. 1). Cross connection can be carried out by interchanging frames to one another by the time switch.

When each of the first through n-th input digital signal is a signal having 44.763 Mb/s which will be called DS3 signal and when it is pulse stuffed to DS3′ signal, a pulse stuffing ratio $\rho$ is determined by:

$$\rho = H - \frac{fo \times H'}{fh'}, \quad (3)$$

where H is number of bits in each DS3 signal to be assigned in a subframe in DS3′ signal and H′ is a number of all bits in one frame of DS3′ signal.

Figure 7:
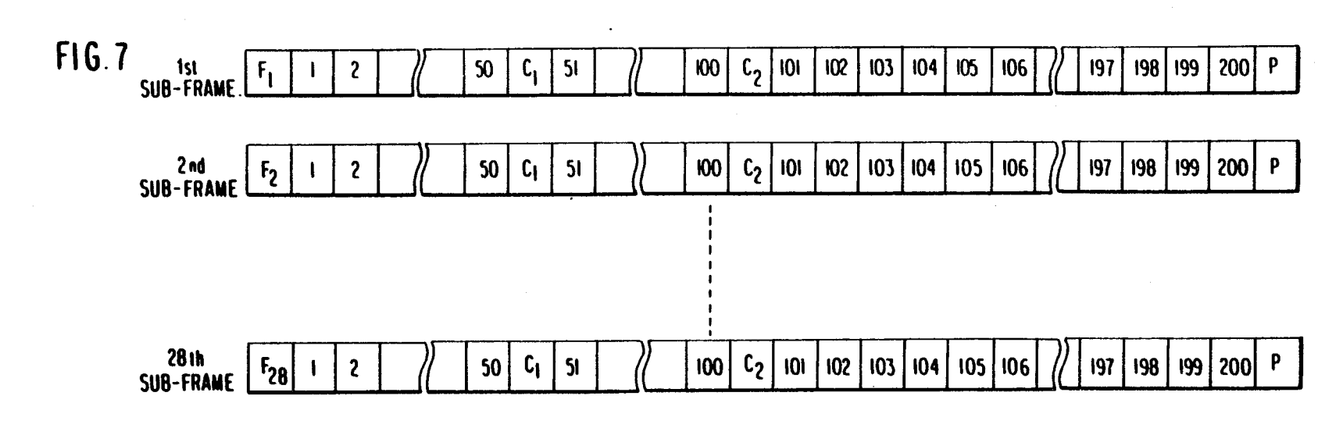
FIG. 7 is a view illustrating a frame format of another DS3' signal which is formed by pulse stuffing a DS3 signal.

FIG. 7 shows a format of one frame of DS3′ signal. The one frame comprises 28 subframes and each subframe comprises a first bit for frame pulse F, data bits 1-200, and control bits $C_1$ and $C_2$ at 52nd and 103rd bits, and a parity bit P at the last bit. Those first to 28th subframes are serially arranged to form a frame and similar n frames for n input DS3 signals are arranged as shown in FIG. 3 by multiplexing those DS3′ signals corresponding to n input DS3 signals.

Figure 8:
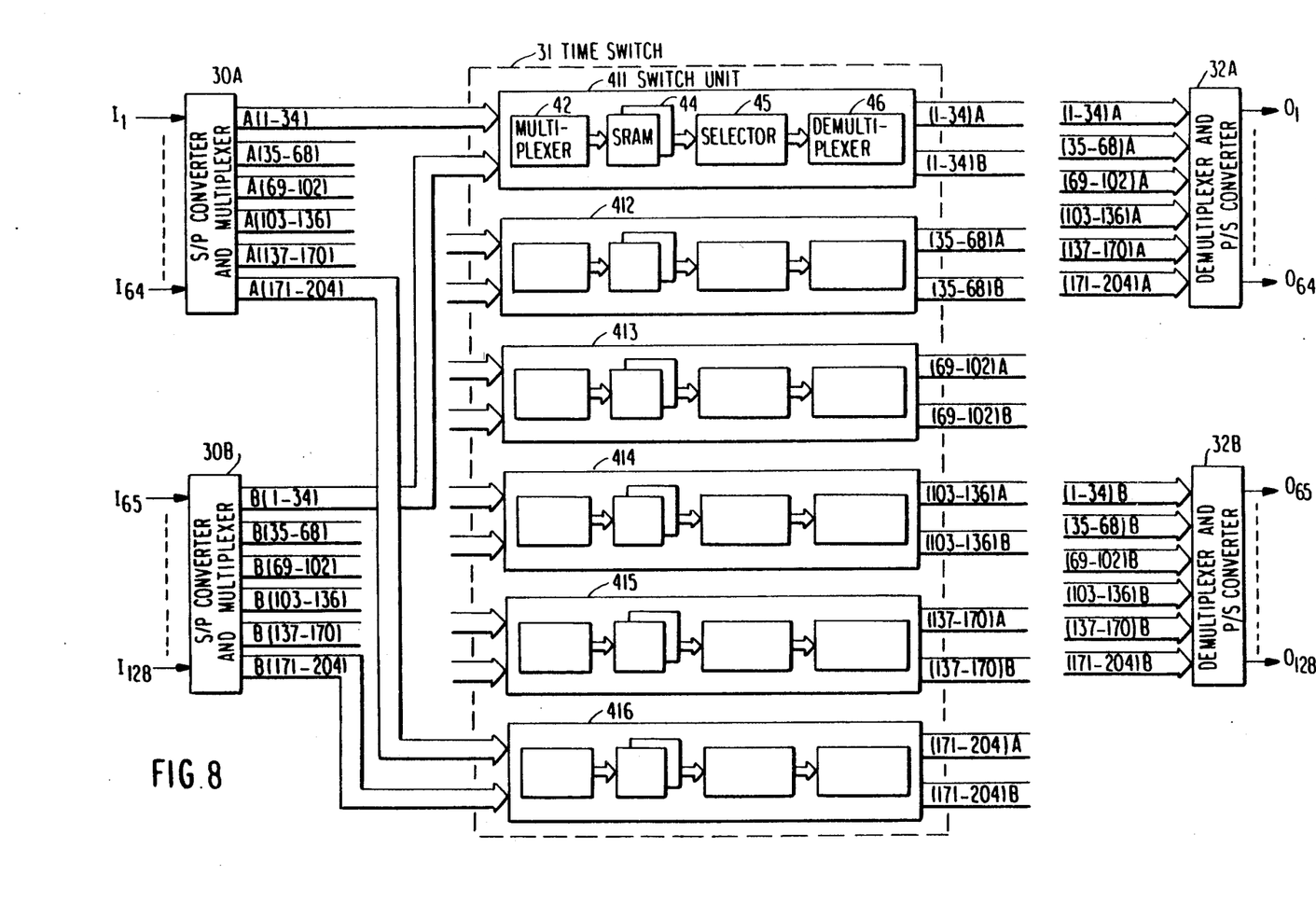
FIG. 8 is a block circuit view illustrating a cross connector unit according to another embodiment.

Referring to FIG. 8, an embodiment of the cross connector unit 25 is shown for one-hundred and twenty-eight (128) input DS3′ signals depicted at I1 to I128. The input signals I1 to I128 may be considered as the pulse stuffed signals synchronized with one another. Each signal has a format as illustrated in FIG. 7.

The first through 128th DS3′ signals I1 to I128 are divided into first and second incoming groups which are composed of the first through the sixty-fourth DS3′ signals I1 to I64 and the sixty-fifth DS3′ signals I65 to I128, respectively, and which are specified by symbols A and B, respectively. In the illustrated cross-connector unit 25, the first and the second incoming groups A and B are delivered to first and second S/P converter and multiplexer units 30A and 30B, respectively.

In the first and second S/P converter and multiplexer units 30A and 30B, the DS3′ signals I1 to I64 and I65 to I128 of each incoming group A and B are converted into first through 204th parallel bit signals A(1-204) and B(1-204). Each set of the first through 204th bit signals is composed of bits in a subframe in a single one of the DS3′ signals.

Figure 9:
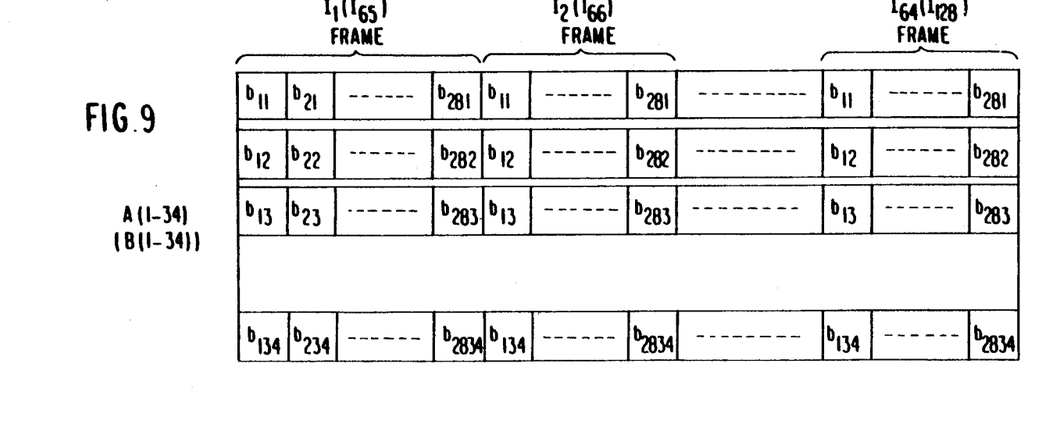
FIG. 9 is a view illustrating formats of 34 parallel multiplexed signals in the cross connector unit of FIG. 8.

The first through 204th parallel bit signals of each incoming group A and B are classified into, for example, first through sixth subgroups each of which is composed of thirty-four bit signals as depicted at A(1-34), A(35-68), . . . , A(171-204), B(1-34), B(35-68), . . . , B(171-204) in the figure. In each subgroup, the corresponding bits in successive subframes are arranged in the order of the subframes to form thirty-four rows each having 28 bits and corresponding subgroups in sixty-four signals in each of incoming group A and B are serially arranged to form thirty-four parallel multiplexed signals as illustrated in FIG. 9 in connection with, for example, A(1-34). B(1-34) are also represented in the same format and therefore "B(1-34)" is labelled with parentheses in FIG. 9.

In FIG. 9, b11 represents a first bit in first subframe and generally bij represents a j-th bit in an i-th subframe, and each of symbols I1 to I64 (I65 to I128) used for representing frames implies that the bit elements in the frame are included in an input DS3′ signal represented by the same symbol.

The multiplexed signals of first through the sixth subgroups of the first and the second incoming groups are sent to a time switch 31 which comprises first through sixth switch units 411 to 416.

More particularly, the 34 parallel multiplexed signals of first subgroups A(1-34) and B(1-34) of the first and the second incoming groups A and B are delivered to the first switch unit 411 through a pair of buses each of which is composed of thirty-four lines. Likewise, the second through the sixth subgroups of the first and the second incoming groups A and B are delivered to the second through the sixth switch units 412 to 416, respectively.

Inasmuch as the first through the sixth switch units 411 to 416 are similar in structure and operation to one another, description will be made about the first switch unit 411 as a representative of the illustrated switch units 411 to 416.

The first switch unit 411 comprises a multiplexer 42, first and second static random access memories (SRAM) 43 and 44, a selector 45, and a demultiplexer 46. The multiplexer 42 multiplexes each one of the parallel multiplexed signals of the first subgroup A(1-34) and each one of the parallel multiplexed signals of subgroup B(1-34) at a multiplicity equal to two by interleaving bits of the both multiplexed signals.

The resultant signals are stored in one of two SRAMs 43 and 44 and are stored in the other after the former is stored full. Reading operation is carried out from one SRAM 43 or 44 to which storing operation is not being carried out. The selector 45 selects one of SRAMs 43 and 44 from which reading operation is permitted.

The reading operation is performed under control of the connection control signal CC (FIG. 1) and frame interchange is performed between some of frames I1 to I64 and I65 to I128 in FIG. 9. The read out signals are arranged in a form similar to the signal multiplexed by interleaving at multiplexer 42, and are demultiplexed at demultiplexer 46. Then, switch unit 461 produces thirty-four parallel signals (1-34)A of subgroup A and another thirty-four parallel signals (1-34)B of subgroup B similar to those of in FIG. 9 but having interchanged frame or frames.

In all of the other switch units 412 to 416, input signals are processed in the similar manner and produce processed signals as depicted at (35-68)A, (35-68)B, . . . , (171-204)A and (171-204)B in the figure. In this connection, A and B imply subgroups A and B, respectively.

The cross connector unit 25 of this embodiment further comprises demultiplexer and P/S converter units 32A and 32B which process input signals in a manner of reversed processes as processes in S/P converter and multiplexer units 30A and 30B.

The produced signals (1-34)A and (1-34)B are supplied to demultiplexer and P/S converter units 32A and 32B, respectively, from first switch unit 411. Similarly, signals of subgroup A and signals of subgroup B from switch units 412 to 416 are supplied to demultiplexer and P/S converter units 32A and 32B, respectively. Those input signals are processed at respective demultiplexer and P/S converter units 32A and 32B to reproduce the DS3' signals which are sent out to respective lines O1 through O128. Thus, the input DS3' signals on input line I1 to I128 are delivered to output lines O1 to O128, respectively, depending to frame interchange at time switch 31.

It will be easily understood that the cross connector unit of FIG. 8 can be applied to cross connect DS3' signals as described in connection with FIGS. 4 and 5.

In the present embodiment, increase or decrease of input and output lines can be readily performed without expansion of unit size. When input and output lines are increased by 28, another S/P and P/S converters are added and are connected to added input and output lines, respectively. The S/P and P/S converters are connected to time switch 31 though respective 36 buses in the similar manner described. Then, the multiplexer 42 in each switch unit 41 is adjusted to have a multiplicity of 3.

Figure 10:
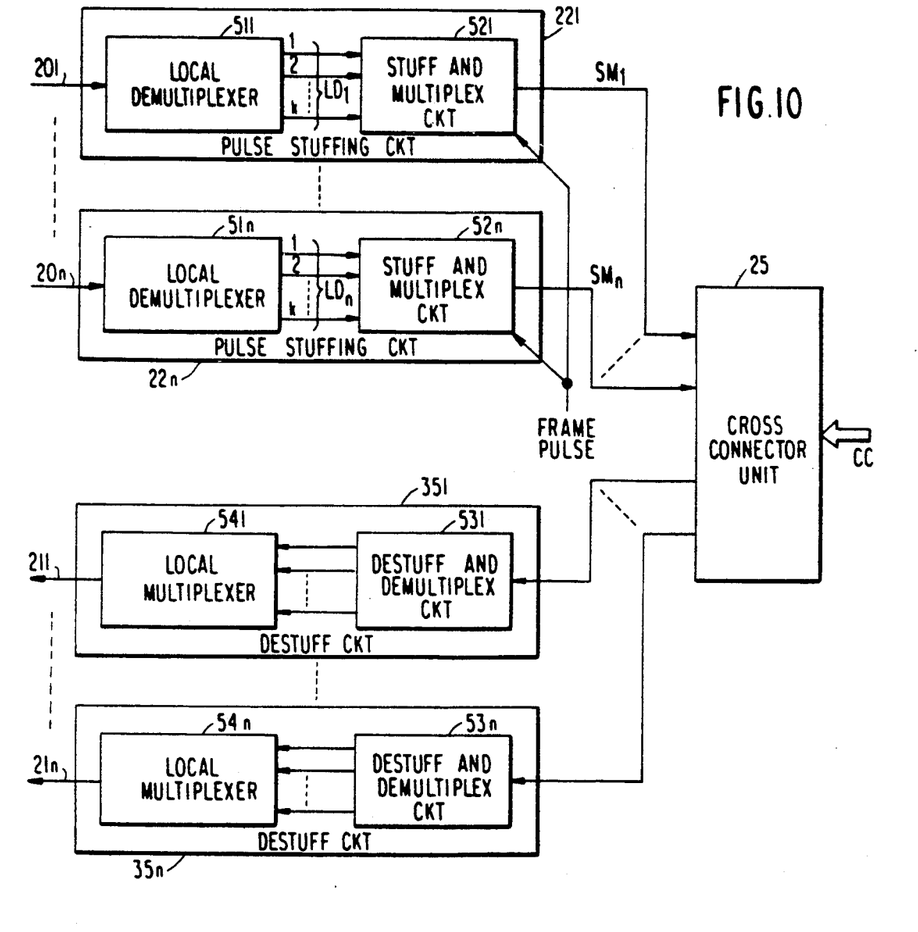
FIG. 10 is a block circuit view illustrating a cross-connection network according to another embodiment of the present invention.

Referring to FIG. 10, a cross-connection network according to another embodiment of this invention is supplied through the first through n-th input lines 201 to 20n with first through n-th asynchronous input digital signals each of which is of a high order group of, for example, DS3 having a bit rate of 44.736 Mb/s. In this connection, the illustrated cross-connection network comprises first through n-th pulse stuffing circuits 221 to 22n which comprise first through n-th local demultiplexers 511 to 51n and first through n-th stuff and multiplex circuits 521 to 52n, respectively.

The first through n-th local demultiplexers 511 to 51n serves to demultiplex the first through n-th input digital signals of the high order group into first through n-th local demultiplexed signals, respectively. Each of the first through n-th local demultiplexed signals LD1 to LDn is composed of first through k-th partial signals of a low order group of, for example, DS1.

The first through n-th local demultiplexed signals LD1 to LDn are sent to the first through n-th stuff and multiplex circuits 521 to 52n, respectively. In each of the first through n-th stuff and multiplex circuits 521 to 52n, the first through k-th partial signals are pulse stuffed and multiplexed into a stuff/multiplex signal in synchronism with each frame pulse.

It will be easily understood that each of the stuff and multiplex circuits 521 to 52n can be arranged similar to the interface of FIG. 6.

Figure 11:
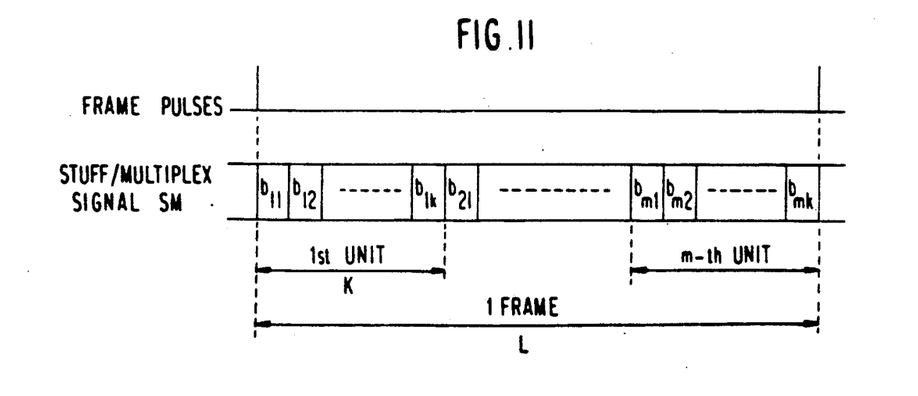
FIG. 11 is a view illustrating a format of a stuffed and multiplexed signal SM in the cross-connection network of FIG. 10.

Referring to FIG. 11, each stuff/multiplex signal is divisible into a succession of frames each of which is composed of first through m-th units. Each of the first through m-th units is composed of first through k-th bits which can collectively be represented by bji, where j is an integer between 1 and m, both inclusive and i represents another integer between 1 and k, both inclusive. Accordingly, j-th one of the first through m-th units are composed of the first through k-th bits bjl to bjk. This shows that a single one of the frames is formed by multiplexing the first through k-th partial signals each of which has a length of m bits. In this event, extra bits, such as a stuff bit and a frame bit, are included in m bits.

In FIG. 10, first through n-th stuff/multiplex signals SM1-SMn are sent from the first through n-th stuff and multiplex circuits 521 to 52n to the cross connector unit 25 in synchronism with the common frame pulses. Therefore, the first through n-th stuff/multiplex signals have frame beginning time instants which simultaneously appear to define the frames.

Figure 12:
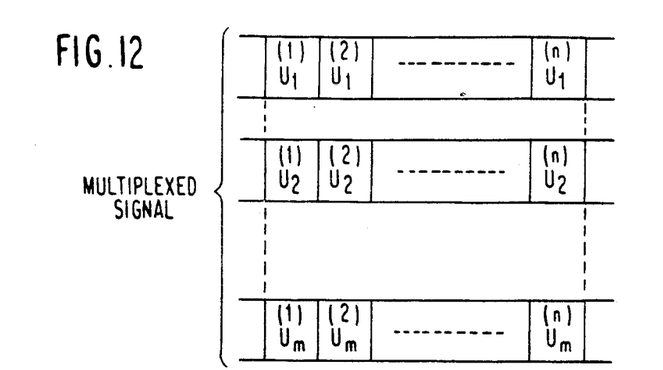
FIG. 12 is a view illustrating formats of m parallel multiplexed signals in the cross-connection network of FIG. 10.

The cross connector unit 25 is operable in a manner similar to that illustrated in conjunction with FIG. 1. More particularly, the first through n-th stuff/multiplex signals SM1-SMn may be subjected to S/P conversion by the use of S/P converters 261 to 26n (FIG. 1), and are multiplexed into m parallel multiplexed signals MU by the multiplexer 28 (FIG. 1). The m parallel multiplexed signals have formats as shown in FIG. 12 wherein n first units $U_2^{(1)}$-$U_1^{(n)}$ are arranged in the first multiplexed signal, n second units $U_2^{(1)}$-$U_2^{(n)}$ being in second multiplexed signal, and n m-th units $U_m^{(1)}$-$U_m^{(n)}$ being in m-th multiplexed signal. Thereafter, the m multiplexed signals MU are sent to the time switch 31. The time switch 31 interchanges or exchanges time slots in each of the multiplexed signals MU to interchange a plurality of units to one another to produce first through m-th interchanged signals. Each of the first through m-th interchanged signals has a multiplexed format similar to FIG. 12 but units being interchanged to one another. The first through m-th interchanged signals are demultiplexed at demultiplexer 33 (FIG. 1) and are subjected to P/S conversion at first through n-th P/S converters 341-34n (FIG. 1). The converted signals have the format similar to FIG. 10 and are delivered to first through n-th destuff circuits 351 to 35n, respectively.

In the example being illustrated, the first through n-th destuff circuits 351 to 35n comprise first through n-th destuff/multiplex circuits 531 to 53n and first through n-th local multiplex circuits 541 to 54n, respectively. Each of the first through n-th destuff/demultiplex circuits 531 to 53n establishes frame synchronization and removes to extra bits from each P/S converted signal. Thereafter, each interchanged signal is demultiplexed into first through k-th digital signals of the low order group. The first through k-th digital signals are multiplexed at each local multiplex circuit of 541-54n into an output digital signal of the high order group. Such output digital signals are sent as first through n-th output signals from the first through n-th local multiplex signals 541 to 54n through the first through n-th output lines 211 to 21n, respectively.

Thus, each of the first through n-th output digital signals carries the first through k-th partial signals of the low order group which are arranged in each input digital signal.

As mentioned above, each input digital signal of the high order group is stuffed and multiplexed after it is demultiplexed into a plurality of digital signals each of which is of a low order group. Therefore, the low order group signals are synchronized to one another. Under the circumstances, the interchange or exchange of the time slots is carried out by the time switch to interchange high order group signals and the interchanged high order group signals are sent to the first through n-th output lines, respectively.

Since cross connection is thus completed by use of the time switch, it is possible to reduce the network in size, and to save a cable laying space, and to rapidly switch routes from one to another by the use of the connection control signal CC.

Figure 13:
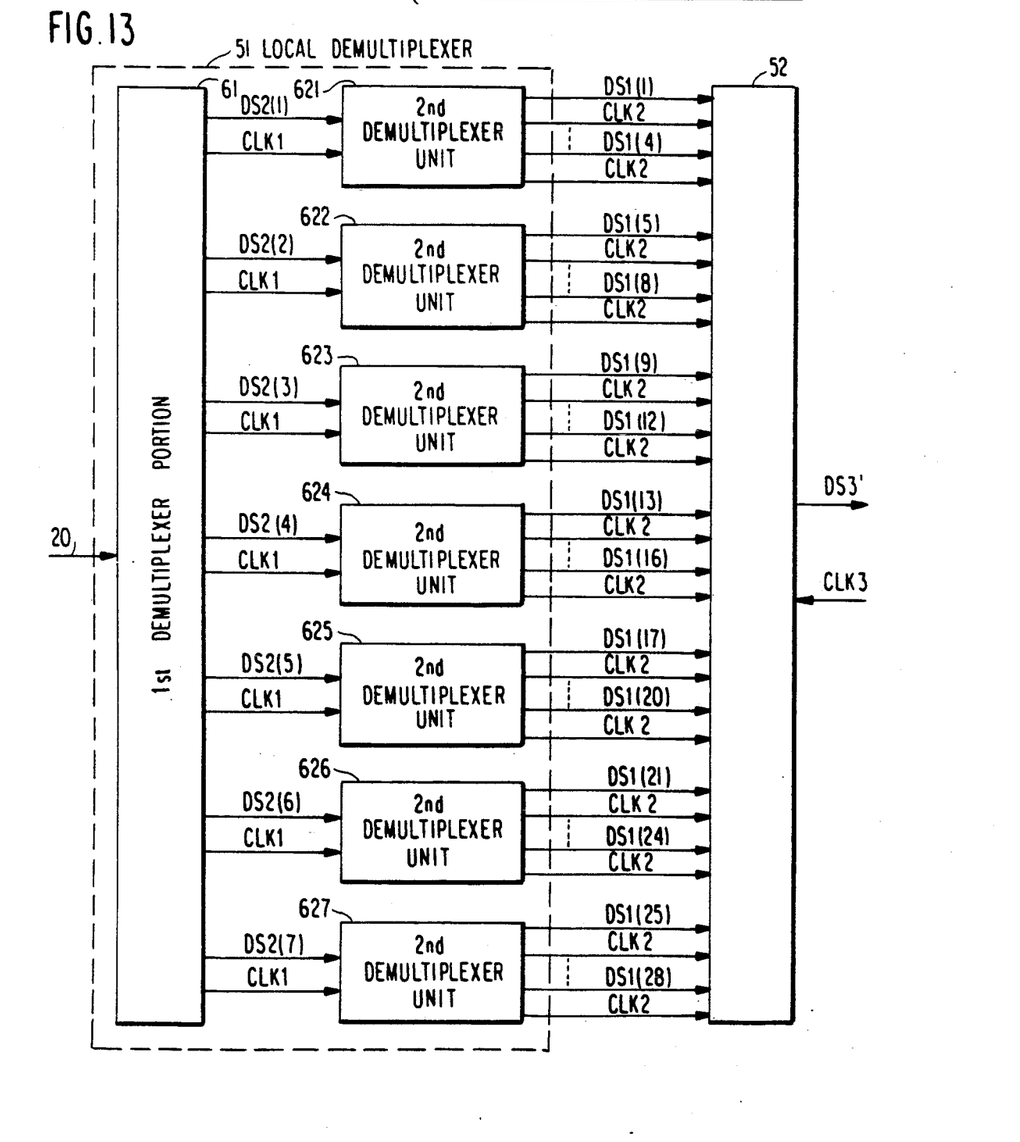
FIG. 13 is a block diagram view illustrating an embodiment of a local demultiplexer in FIG. 10.

In FIG. 13, an example of one of local demultiplexer in FIG. 10 is shown together with an associated stuff and multiplex circuit. The local multiplexer and the stuff and multiplex circuit are depicted at 51 and 52.

In the example being illustrated, the input digital signal of the high order group, namely, DS3 having the bit rate of 44.736 Mb/s is supplied to local demultiplexer 51 through the input line 20 (suffix omitted) and the stuff and multiplexer 52 serves to supply the cross connector unit 25 (FIG. 10) with a rearranged signal which can be interchanged or exchanged by the time switch 31 (FIG. 1) and which may be of the high order group DS3' having a format as shown in FIG. 4 or 5.

Referring to FIG. 13, the local demultiplexer 51 comprises a first demultiplexer portion 61 and a second demultiplexer portion 62 between the first demultiplexer portion 61 and the stuff and multiplex circuit 52.

Supplied with the input digital signal DS3, the first demultiplex portion 61 demultiplexes the input digital signal DS3 into first through seventh demultiplexed signals each of which is composed of a lower order group, namely, DS2 and which have a bit rate of 6.312 Mb/s. Therefore, the first through seventh demultiplexed signals will be collectively represented by DS2(1) to DS2(7). The first through seventh demultiplexed signals are also destuffed at the demultiplexer portion 61.

The first through seventh demultiplexed signals DS2(1) to DS2(7) are sent to first through seventh demultiplex units 621 to 627 of the second demultiplex portion 62 together with first internal clocks CLK1 of 6.312 Mb/s. Each of the first through the seventh demultiplex units 621 to 627 demultiplexes and destuffs each of the first through the seventh demultiplexed signals DS2(1) to DS2(7) into four subsidiary demultiplexed signals each of which is of a lower order group, namely, DS1 having a bit rate of 1.544 Mb/s and which is destuffed. Therefore, the subsidiary demultiplexed signals may be referred to as DS1 group signals. As a result, first through twenty-eighth ones of the subsidiary signals are produced from the first through the seventh demultiplex units 621 to 627 in synchronism with second interval clocks CLK2 of 1.544 Mb/s and may be represented by DS1(1) to DS1(28), respectively.

The first through twenty-eighth subsidiary signals DS1(1) to DS1(28) are delivered to the stuff and multiplex circuit 52 together with the second clocks CLK2. The stuff and multiplex circuit 52 carries out to pulse stuffing on, and multiplexing of, the first through twenty-eighth subsidiary signals by use of a third internal clock CLK3 having a bit rate of 45.736 Mb/s to form the DS3' signal having the frame multiframe format as shown in FIG. 4.

Figure 14:
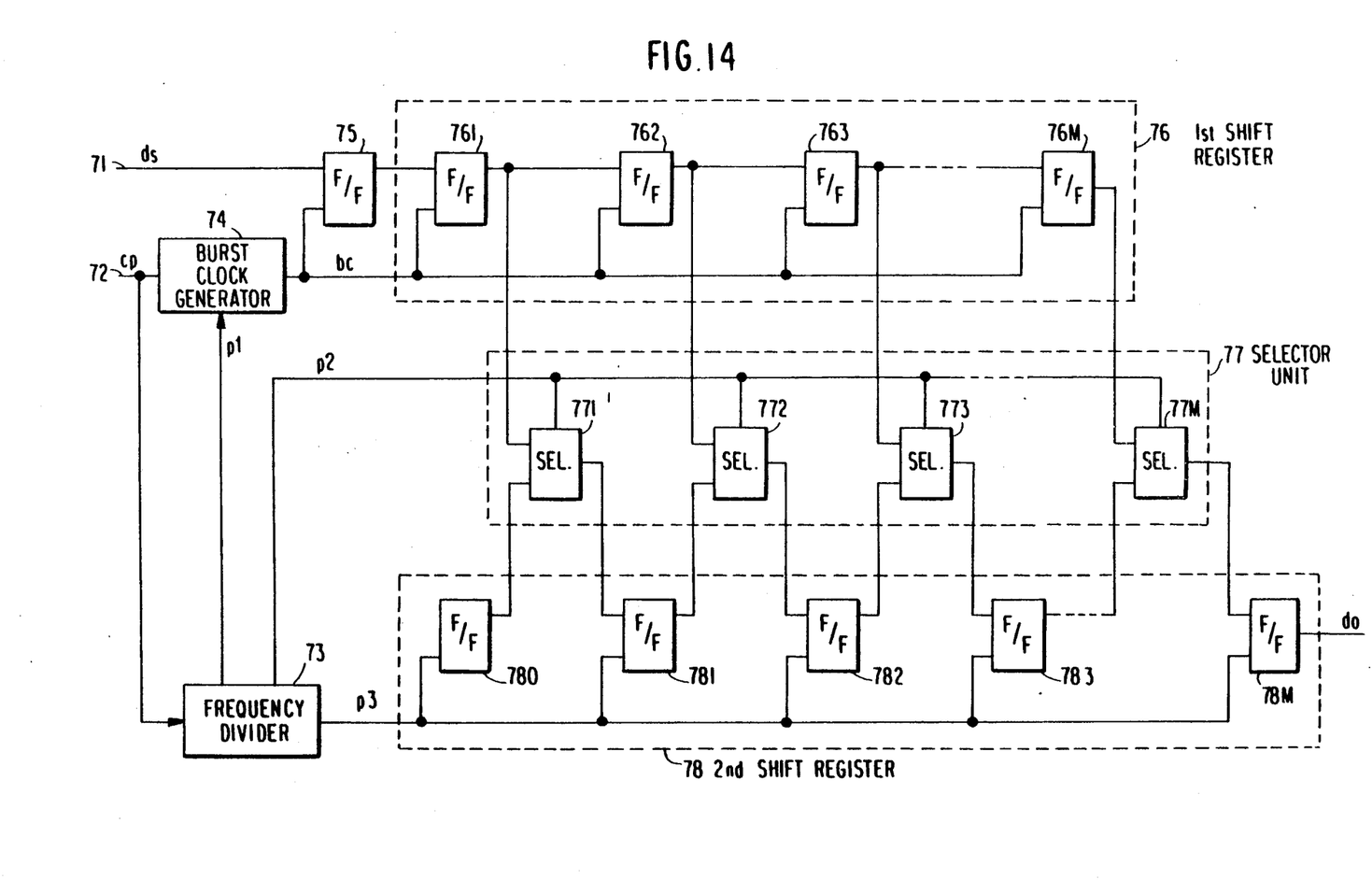
FIG. 14 is a block circuit view illustrating a digital data smoothing circuit which is used for destuffing extra bits in the cross-connection network of the present invention.

In FIG. 14, an example of a destuff circuit shown therein is a, so called, digital data signal smoothing circuit and is cored in the cross connection system of the present invention so as to remove the extra bits such as frame pulses, stuff pulses, stuff control pulses, vacant bits and others in a digital data signal.

Referring to FIG. 14, the smoothing circuit comprises a data signal input terminal 71 and a clock input terminal 72. The data input terminal 71 receives a digital data signal ds (ds in FIG. 15) having a bit rate of fn. The clock input terminal 72 receives a clock pulse cp having the bit rate fn.

Figure 15:
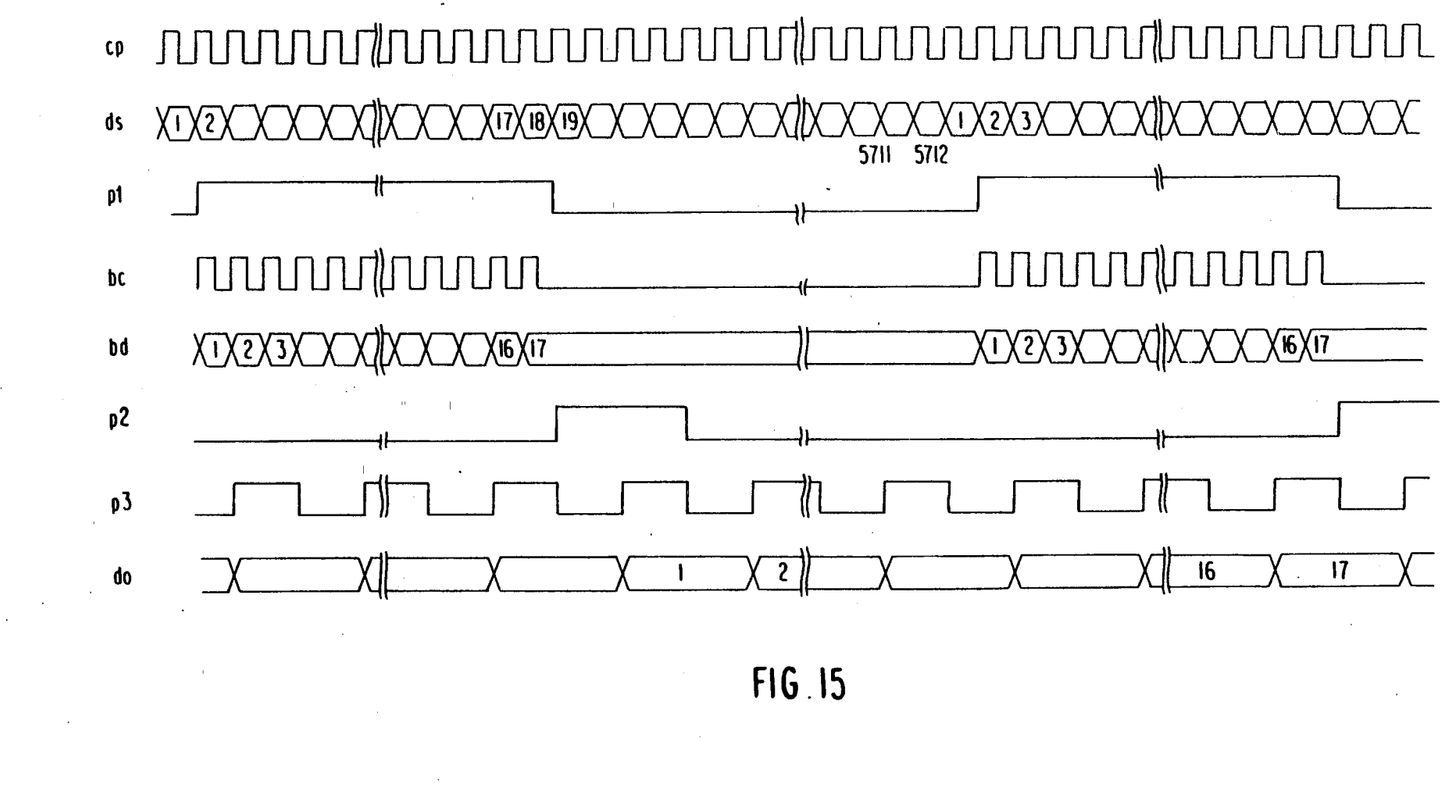
FIG. 15 is a view illustrating timing relationships between various signals in the circuit of FIG. 14.

The clock pulse cp is supplied to a frequency divider 73 which, in turn, dividers the clock pulse cp to produce first through third frequency divided pulse signals p1, p2, and p3 (p1, p2, and p3 in FIG. 15).

The clock pulse cp is also applied to a first clock generating circuit 74 which generates a burst clock signal bc from the clock pulse signal cp under control of the first pulse signal p1. The burst clock generating circuit 74 comprises an OR gate having two input terminals to which the clock pulse signal cp and the first pulse signal p1 are applied, respectively. Accordingly, the clock pulse signal cp is permitted to pass through the OR gate only for a time duration of a pulse of the first pulse signal p1 and a burst clock signal bc is obtained on an output of the OR gate. The pulse duration of the first pulse signal p1 is determined a time period over M (integer) successive clock pulses per N (interger N>M) successive clock pulses. Therefore, the burst clock signal bc comprises M successive clock pulses repeatedly generating each interval of N successive clock pulses.

The digital data signal ds is applied to a burst data signal generating circuit which is composed of a flipflop (F/F) circuit 75. The digital data signal ds is reformed by the F/F circuit 75 in synchronization with the burst clock signal bc which is applied to the F/F circuit 75. Therefore, the F/F circuit 75 produces a burst data signal bd (bd in FIG. 15) in response to the burst clock signal bc. That is, some, that is M data bits, of successive N data bits in the digital data signal ds are repeatedly derived as the burst data signal bd and the remaining data bits are removed.

The burst data signal bd is applied to a first shift register 76 under control of the burst clock signal bc. The first shift register 76 comprises M F/F circuits 761-76M connected in cascade.

Output signals of the F/F circuits 761-76M are supplied in parallel to one another to a selector unit 77 which comprises M selectors 771-77M. The selectors 771-77M operates in response to the second pulse signal p2 to supply the output signals from the F/F circuits 761-76M to a second shift register 78. The second shift register 78 comprises o-th through M-th F/F circuits 780-78M which are connected in cascade through selectors 771-77M.

In absence of the second pulse signal p2, each selector of 771-77M connects between adjacent two F/F circuits connected to each other through the selector.

The third signal p3 is applied from the frequency decider 73 to F/F circuits 780-78M. Therefore, the M data bits in the second shift register 78 are serially sent out from the last stage F/F circuit 78M as an output data signal do.

The third pulse signal p3 has comprises succession pulses with a bit rate of fn×M/N and a pulse of the second pulse signal p2 has a pulse width equal to one bit of the third pulse signal p3. The pulse of the third pulse signal p3 is generated at the end of each one pulse of the first pulse signal p1.

In the example shown in FIG. 14, N and M are selected 5172 and 17. However, N and M can be determined as desired.

What is claimed is:

1. An internal frame signal producing circuit for use in a cross connection system for cross connecting n, n being an integer number, digital signals of a first bit rate, each being produced by multiplexing m, m being an integer number, digital signals of a second bit rate lower than said first bit rate by either a stuff synchronization multiplexing or a synchronizing multiplexing technique, at a first or second bit rate digital signal level by use of a time division switch, said second bit rate digital signals being synchronous with each other, said internal frame signal producing circuit comprising:

means for preselecting an internal frame frequency to be equal to a frequency $f_h'$ higher than a first nominal frequency $f_h$ of said first bit rate digital signals by a predetermined value, said frequency $f_h'$ being synchronized with a second nominal frequency fl of said second bit rate digital signals, means for forming frames in a synchronous state position to have a frame length k at each of said m second bit rate digital signals to produce m formed signals;

means for arranging said m formed signals to thereby make a multiframe length L be equal to (k × m) bits; and means for assigning vacant slots to all of bits in one frame at predetermined frame intervals in order to compensate a frequency difference between said higher frequency $f_h'$ and said second nominal frequency fl.

2. An internal frame signal producing circuit as claimed in claim 1, said n first bit rate digital signals being supplied as input signals, which further comprises means for demultiplexing each of said n first bit rate digital signals into said synchronous m second bit rate digital signals which are delivered to said forming means.

* * * * *